US012404774B2

(12) United States Patent
Kwak

(10) Patent No.: US 12,404,774 B2
(45) Date of Patent: Sep. 2, 2025

(54) BLADE FASTENING ASSEMBLY AND GAS TURBINE INCLUDING SAME

(71) Applicant: DOOSAN ENERBILITY CO., LTD., Changwon (KR)

(72) Inventor: Young Seob Kwak, Changwon (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 18/507,012

(22) Filed: Nov. 10, 2023

(65) Prior Publication Data

US 2024/0254881 A1 Aug. 1, 2024

(30) Foreign Application Priority Data

Jan. 27, 2023 (KR) ........................ 10-2023-0011089

(51) Int. Cl.

| | |
|---|---|
| ***F01D 5/10*** | (2006.01) |
| *F01D 5/02* | (2006.01) |
| *F01D 5/06* | (2006.01) |
| *F04D 29/32* | (2006.01) |
| *F04D 29/64* | (2006.01) |

(52) U.S. Cl.

CPC ................ *F01D 5/10* (2013.01); *F01D 5/025* (2013.01); *F01D 5/066* (2013.01); *F04D 29/321* (2013.01); *F04D 29/644* (2013.01); *F05D 2260/36* (2013.01); *F05D 2260/96* (2013.01)

(58) Field of Classification Search

None

See application file for complete search history.

(56) References Cited

U.S. PATENT DOCUMENTS

| | | | | |
|---|---|---|---|---|
| 9,145,771 | B2 * | 9/2015 | Malmborg | F01D 5/087 |
| 2009/0324414 | A1 | 12/2009 | Helmis | |
| 2012/0027606 | A1 * | 2/2012 | Malmborg | F04D 29/321 416/214 R |
| 2012/0177499 | A1 | 7/2012 | Helmis | |

FOREIGN PATENT DOCUMENTS

| | | | |
|---|---|---|---|
| JP | 2005054738 | A | 3/2005 |
| JP | 2016524082 | A | 8/2016 |
| JP | 2017198190 | A | 11/2017 |
| KR | 10-2006-0087872 | A | 8/2006 |
| KR | 101967067 | B1 | 4/2019 |
| KR | 1020200116736 | A | 10/2020 |

* cited by examiner

*Primary Examiner* — Juan G Flores

(74) *Attorney, Agent, or Firm* — Harvest IP Law, LLP

(57) ABSTRACT

A rotor disk assembly and a gas turbine including the same are provided. The rotor disk assembly includes a rotor disk, a protrusion formed on one side of a lower portion of the rotor disk, and a contact protruding from an outer peripheral surface of a tie rod to contact the protrusion to prevent sagging of the tie rod and control vibration.

17 Claims, 6 Drawing Sheets

BLADE FASTENING ASSEMBLY AND GAS TURBINE INCLUDING SAME

CROSS REFERENCE TO RELATED APPLICATION

The present application claims priority to Korean Patent Application No. 10-2023-0011089, filed on Jan. 27, 2023, the entire contents of which are incorporated herein for all purposes by this reference.

BACKGROUND

1. Technical Field

The present disclosure relates to a rotor disk assembly and a gas turbine including the same.

2. Description of the Background Art

A gas turbine is a combustion engine in which a mixture of air compressed by a compressor and fuel is combusted to produce a high temperature gas, which drives a turbine. The gas turbine is used to drive electric generators, aircraft, ships, trains, or the like.

The gas turbine generally includes a compressor, a combustor, and a turbine. The compressor serves to intake external air, compress the air, and transfer the compressed air to the combustor. The compressed air compressed by the compressor has a high temperature and a high pressure. The combustor serves to mix compressed air from the compressor and fuel and combust the mixture of compressed air and fuel to produce combustion gases, which are discharged to the gas turbine. The combustion gases drive turbine blades in the turbine to produce power. The power generated through the above processes is applied to a variety of fields such as generation of electricity, driving of mechanical units, etc.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and an objective of the present disclosure is to provide a rotor disk assembly capable of simplifying the manufacturing process, improving the ease of assembly, and reducing material costs, and a gas turbine including the same.

In an aspect of the present disclosure, there is provided a rotor disk assembly including: a rotor disk; a protrusion formed on one side of a lower portion of the rotor disk; and a contact protruding from an outer peripheral surface of a tie rod to contact the protrusion to prevent sagging of the tie rod and control vibration.

The protrusion may be integrally formed with the rotor disk.

The protrusion may be formed to protrude laterally from a bottom surface of a radially inner end of the rotor disk.

The protrusion may have a first inclined surface protruding laterally being inclined at a predetermined angle towards the outer peripheral surface of the tie rod.

The contact may be integrally formed with the tie rod.

The contact may be formed in a position corresponding to the protrusion.

The contact may be provided on an upper surface thereof with a second inclined surface formed at an angle corresponding to the first inclined surface.

The rotor disk may be at least one of a compressor rotor disk, a turbine rotor disk, and a torque tube disk.

In another aspect of the present disclosure, there is provided a gas turbine including: a compressor configured to compress air; a combustor configured to mix the compressed air from the compressor with fuel and combust a compressed air-fuel mixture; a turbine section rotated by combustion gases from the combustor to generate power; and a rotor disk assembly including: a rotor disk; a protrusion formed on one side of a lower portion of the rotor disk; and a contact protruding from an outer peripheral surface of a tie rod installed through the rotor disk to contact the protrusion to prevent sagging of the tie rod and control vibration.

The protrusion may be integrally formed with the rotor disk.

The protrusion may be formed to protrude laterally from a bottom surface of a radially inner end of the rotor disk.

The protrusion may have a first inclined surface protruding laterally being inclined at a predetermined angle towards the outer peripheral surface of the tie rod.

The contact may be integrally formed with the tie rod.

The contact may be formed in a position corresponding to the protrusion.

The contact may be provided on an upper surface thereof with a second inclined surface formed at an angle corresponding to the first inclined surface.

The rotor disk may be at least one of a compressor rotor disk, a turbine rotor disk, and a torque tube disk.

Details of other implementations of various aspects of the present disclosure will be described in the following detailed description.

According to embodiments of the present disclosure, the rotor disk assembly performs substantially the same function as a conventional stiffener, while allowing for a simpler manufacturing process, improved assembly convenience, and reduced material costs.

DETAILED DESCRIPTION

Figure 1:
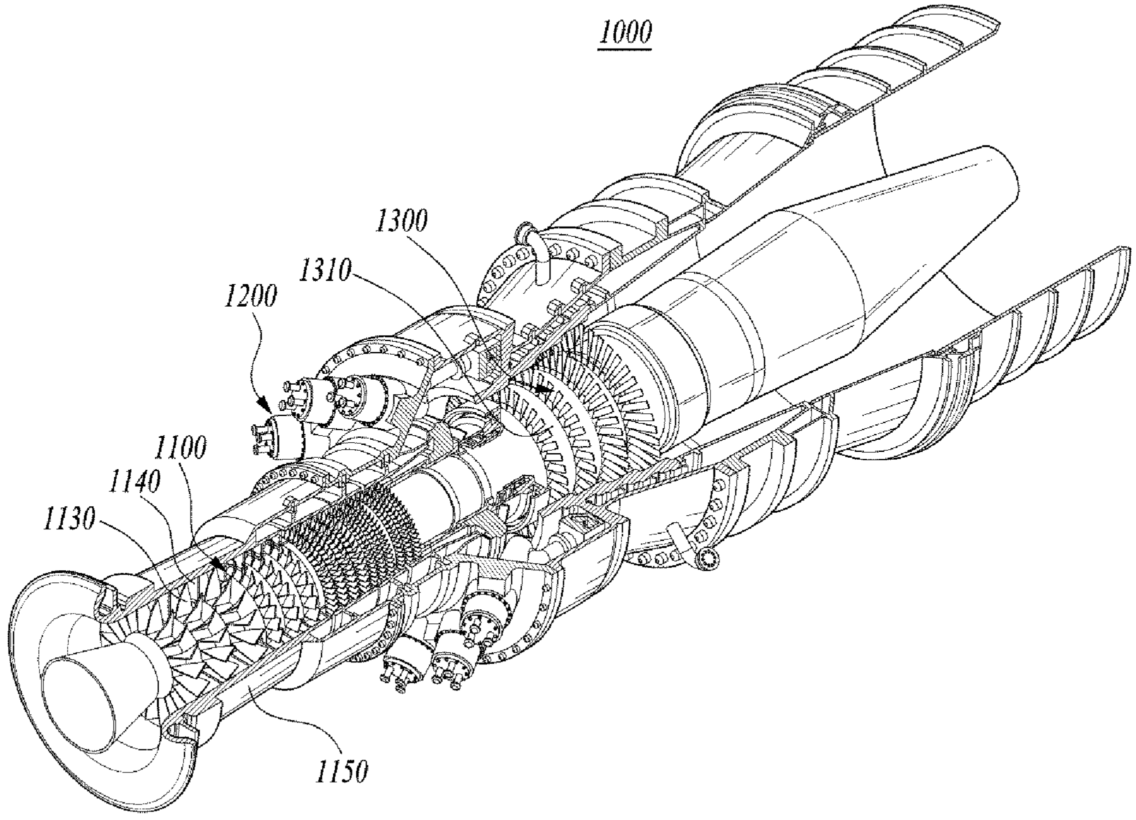
FIG. 1 is a view illustrating the interior of a gas turbine according to an embodiment of the present disclosure.

Hereinafter, exemplary embodiments of the present disclosure will be described in detail with reference to the accompanying drawings. However, it should be noted that the present disclosure is not limited thereto, and may include all of modifications, equivalents or substitutions within the spirit and scope of the present disclosure.

Terms used herein are used to merely describe specific embodiments, and are not intended to limit the present disclosure. As used herein, an element expressed as a singular form includes a plurality of elements, unless the context clearly indicates otherwise. Further, it will be understood that the term "comprising" or "including" specifies the presence of stated features, numbers, steps, operations, elements, parts, or combinations thereof, but does not preclude the presence or addition of one or more other features, numbers, steps, operations, elements, parts, or combinations thereof.

Hereinafter, preferred embodiments of the present disclosure will be described in detail with reference to the accompanying drawings. It is noted that like elements are denoted in the drawings by like reference symbols as whenever possible. Further, the detailed description of known functions and configurations that may obscure the gist of the present disclosure will be omitted. For the same reason, some of the elements in the drawings are exaggerated, omitted, or schematically illustrated.

Figure 2:
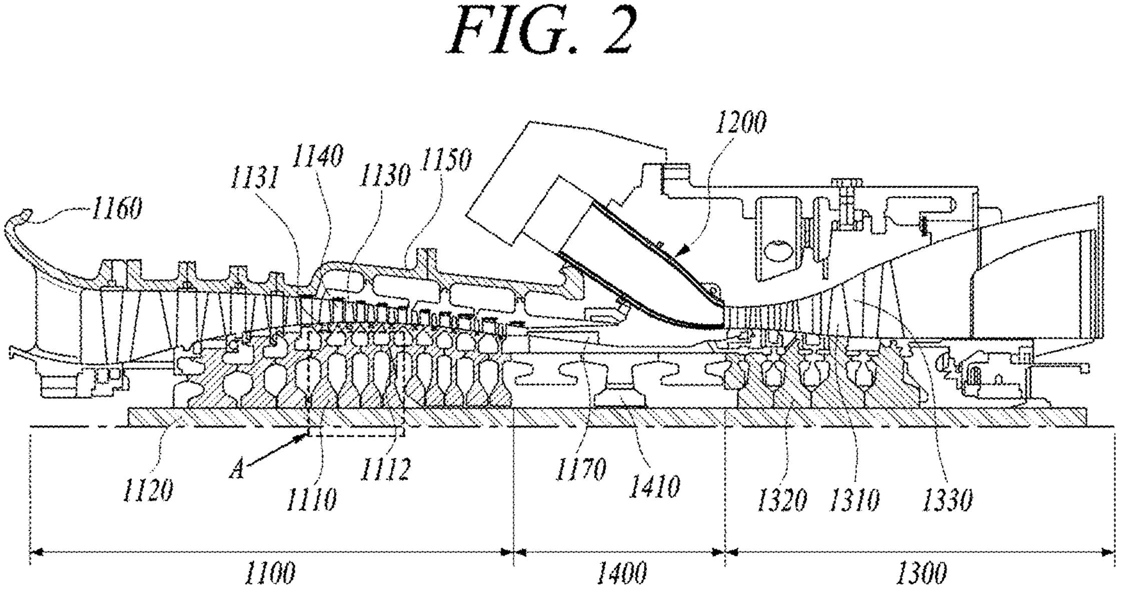
FIG. 2 is a conceptual view illustrating the gas turbine in a cross section according to an embodiment of the present disclosure.

FIG. 1 is a view illustrating the interior of a gas turbine according to an embodiment of the present disclosure, and FIG. 2 is a conceptual view illustrating the gas turbine in a cross section according to an embodiment of the present disclosure, As illustrated in FIGS. 1 and 2, a gas turbine 1000 according to an embodiment of the present disclosure includes a compressor 1100, a combustor 1200, and a turbine section 1300. The compressor 1100 sucks and compresses external air, and the combustor 1200 mixes air compressed by the compressor 1100 with fuel and combusts a compressed air-fuel mixture. The turbine section 1300 has turbine blades 1310 mounted therein such that combustion gases emitted from combustor 1200 cause the turbine blades 1310 to rotate. Between the compressor 1100 and the turbine section 1300, a torque tube 1400 is disposed as a torque transmission member that transmits the rotational torque generated by the turbine section 1300 to the compressor 1100.

The compressor 1100 includes compressor rotor disks 1110, a tie rod 1120, compressor blades 1130, compressor vanes 1140, a compressor casing 1150, an intake 1160, and a compressor diffuser 1170.

The compressor rotor disk 1110 is mounted with compressor blades 1130, and the tie rod 1120 is located through the compressor rotor disks 1110. The compressor rotor disk 1110 rotates with the rotation of the tie rod 1120 to rotate the compressor blades 1130. There may be a plurality of compressor rotor disks 1110.

The plurality of compressor rotor disks 1110 are fastened so as not to be axially spaced apart from each other by the tie rod 1120. Each of the compressor rotor disks 1110 is aligned along the axial direction with the tie rod 1120 passing therethrough. The compressor rotor disk 1110 may be provided with a plurality of protrusions (not shown) formed on an outer peripheral surface thereof, and a flange (not shown) that is coupled to rotate with an adjacent compressor rotor disk 1110.

A compressor disk cooling oil path 1112 may be formed in at least one of the plurality of compressor rotor disks 1110. Through the compressor disk cooling oil path 1112, compressed air compressed by the compressor blades 1130 of the compressor 1100 may be moved toward the turbine section 1300 to cool the turbine blades 1310.

The tie rod 1120 is arranged to pass through the center of the compressor rotor disks 1110 and turbine rotor disks 1320, wherein the tie rod 1120 may be composed of a single tie rod or a plurality of tie rods. The tie rod 1120 receives the torque generated by the turbine section 1300 to rotate the compressor rotor disks 1110. For this purpose, a torque tube 1400 is disposed between the compressor 1100 and the turbine section 1300 as a torque transmission member that transmits the rotational torque generated by the turbine section 1300 to the compressor 1100.

The shape of the tie rod 1120 is not limited to that shown in FIG. 2, but may have a variety of structures depending on the gas turbine. That is, as shown in the drawing, one tie rod may have a shape passing through a central portion of the rotor disk, a plurality of tie rods may be arranged in a circumferential manner, or a combination thereof may be used.

The compressor blades 1130 are radially coupled to the outer peripheral surface of the compressor rotor disk 1110. The compressor blades 1130 may be formed in a multi-stage configuration. The compressor blade 1130 may have a compressor blade root member 1131 formed for engagement with the compressor rotor disk 1110, and the compressor rotor disk 1110 may have a compressor disk slot formed for insertion of the compressor blade root member 1131.

The compressor blades 1130 rotate along with the rotation of the compressor rotor disk 1110 to compress the incoming air, moving the compressed air to the compressor vanes 1140 at the next stage. Air is compressed to increasingly higher pressures as it passes through the multi-stage compressor blades 1130.

The compressor vanes 1140 are mounted in a multi-stage configuration in an interior of the compressor casing 1150. The compressor vanes 1140 guide compressed air moved from the front side compressor blades 1130 to the rear side compressor blades 1130. In an embodiment, at least some of the compressor vanes 1140 may be mounted to be rotatable within a predetermined range to adjust the amount of incoming air, for example. The compressor casing 1150 forms the exterior of the compressor 1100. The compressor casing 1150 internally houses the compressor rotor disks 1110, the tie rod 1120, the compressor blades 1130, the compressor vanes 1140, and the like.

The compressor casing 1150 may have connection tubes formed to flow compressed air compressed in multiple stages by the compressor blades 1130 in multiple stages toward the turbine section 1300 to cool the turbine blades.

At an inlet of the compressor 1100, an intake 1160 is provided. The intake 1160 draws external air into the compressor 1100. At an outlet of the compressor 1100, a compressor diffuser 1170 is disposed to diffuse the compressed air. The compressor diffuser 1170 rectifies the compressed air from the compressor 1100 before it is supplied to the combustor 1200, and converts some of the kinetic energy of the compressed air to static pressure. After passing through the compressor diffuser 1170, the compressed air enters the combustor 1200.

The combustor 1200 mixes the introduced compressed air with fuel and combusts the air-fuel mixture to produce a high-temperature and high-temperature and high-pressure combustion gas. With an isobaric combustion process in the compressor, the temperature of the combustion gas is increased to the heat resistance limit that the combustor and the turbine components can withstand.

The combustor consists of a plurality of combustors, which is arranged in the housing formed in a cell shape, and includes a burner having a fuel injection nozzle and the like, a combustor liner forming a combustion chamber, and a transition piece as a connection between the combustor and the turbine, thereby constituting a combustion system of a gas turbine.

Specifically, the combustor liner provides a combustion space in which the fuel injected by the fuel nozzle is mixed with the compressed air of the compressor and the fuel-air mixture is combusted. Such a liner may include a flame canister providing a combustion space in which the fuel-air mixture is combusted, and a flow sleeve forming an annular space surrounding the flame canister. A fuel nozzle is coupled to the front end of the liner, and an igniter plug is coupled to the side wall of the liner.

On the other hand, a transition piece is connected to a rear end of the liner so as to transmit the combustion gas combusted by the igniter plug to the turbine side. An outer wall of the transition piece is cooled by the compressed air supplied from the compressor so as to prevent thermal breakage due to the high temperature combustion gas.

To this end, the transition piece is provided with cooling holes through which compressed air is injected into and cools the inside of the transition piece and flows towards the liner.

The air that has cooled the transition piece flows into the annular space of the liner and compressed air is supplied as a cooling air to the outer wall of the liner from the outside of the flow sleeve through cooling holes provided in the flow sleeve so that both air flows may collide with each other.

In the meantime, the high-temperature and high-pressure combustion gas from the combustor is supplied to the turbine 1300. The high-temperature and high-pressure combustion gas expands and collides with and provides a reaction force to rotating blades of the turbine to cause a rotational torque, which is then transmitted to the compressor through the torque tube 1400. Here, an excess of power required to drive the compressor is used to drive a generator or the like.

The turbine 1300 is basically similar in structure to the compressor. That is, the turbine 1300 is also provided with a plurality of turbine rotor disks 1320 similar to the compressor rotor disks of the compressor. Thus, the turbine rotor disk 1320 also includes a plurality of turbine blades 1310 disposed radially. The turbine blade 1310 may be coupled to the turbine rotor disk 1320 in a dovetail coupling manner, for example. Between the turbine blades 1310, a turbine vane 1330 fixed to a turbine casing is provided to guide a flow direction of the combustion gas passing through the turbine blades 1310.

Figure 3:
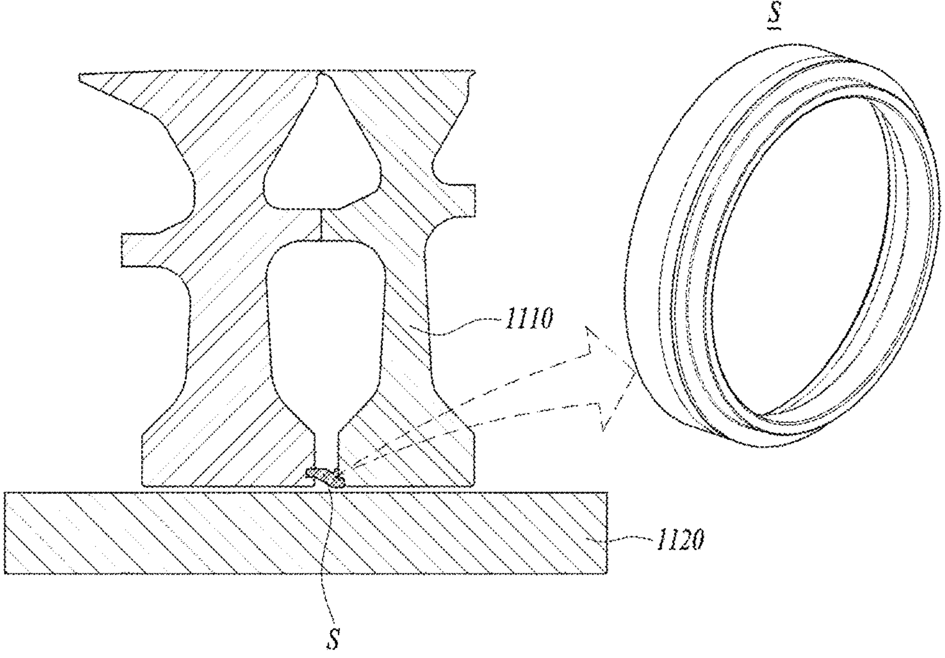
FIG. 3 Prior Art
FIG. 3 is a view illustrating a conventional stiffener for securing the rotor disk.

FIG. 3 is a view illustrating a conventional stiffener for securing the rotor disk, Referring to FIG. 3, an annular ring-shaped stiffener S is installed on the outer peripheral surface of the tie rod 1120. The stiffener S is inserted into a tie rod 1120 side end of the compressor rotor disk 1110 to separate the compressor rotor disk 1110 and the tie rod 1120 by a predetermined distance. The tie rod 1120 side end of the compressor rotor disk 110 means a radially inner end of the compressor rotor disk 1110. This serves the function of preventing sagging and controlling vibration of the tie rod 1120.

After being fitted into the outer peripheral surface of the tie rod 1120 so that the end is inserted into the tie rod 1120 side end of the compressor rotor disk 1110, the annular ring-shaped stiffener S is assembled to the compressor rotor disk 1110 and the tie rod 1120 by a hot-sealing method. The stiffener S assembled by the heat-sealing method performs its function while continuously being in contact between the compressor rotor disk 1110 and the tie rod 1120 under gas turbine operation conditions.

Figure 4:
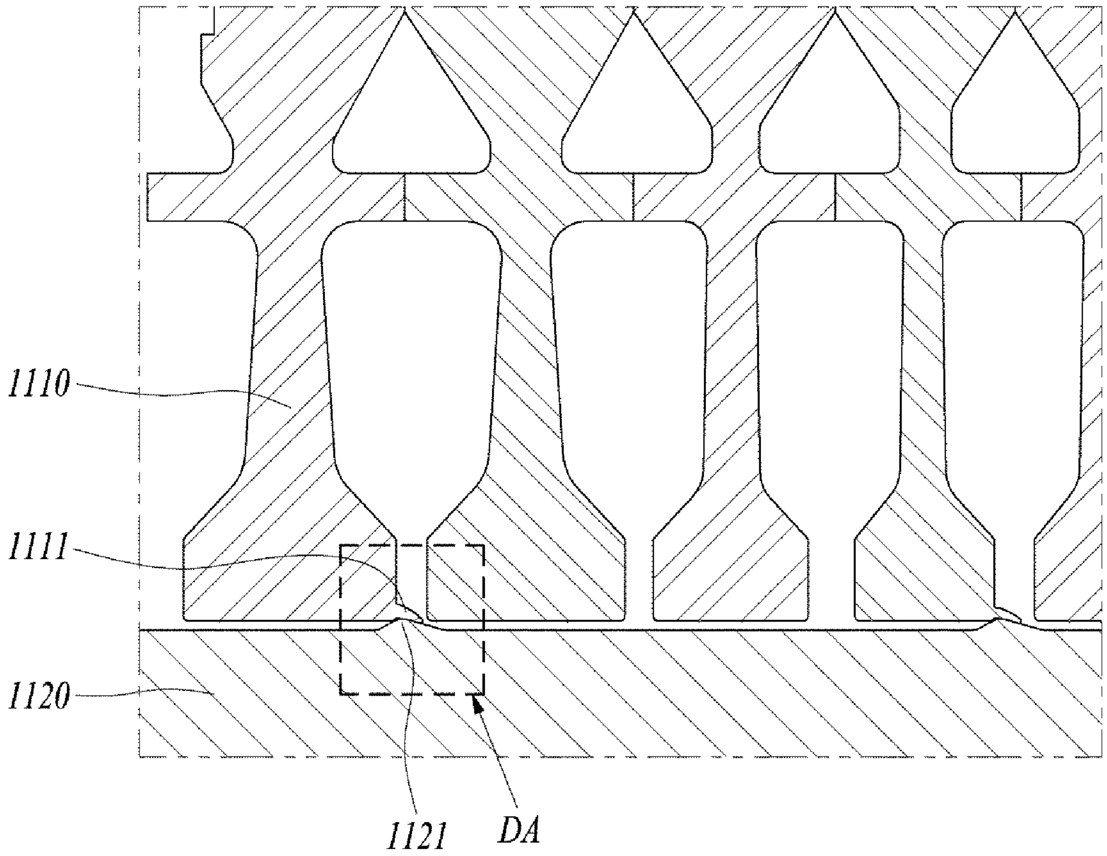
FIG. 4 is a cross-sectional view illustrating a rotor disk assembly according to an embodiment of the present disclosure, with a section A of FIG. 2 enlarged.
Figure 5:
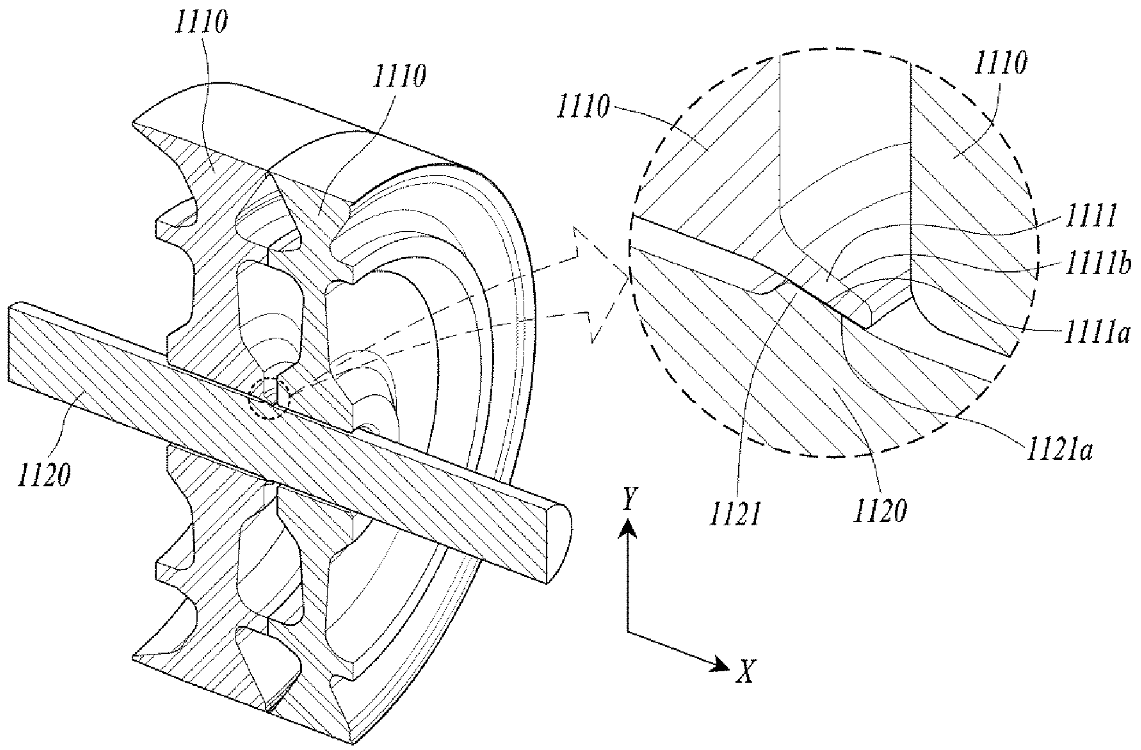
FIG. 5 is a perspective view illustrating the rotor disk assembly according to an embodiment of the present disclosure.

FIG. 4 is a cross-sectional view illustrating a rotor disk assembly DA according to an embodiment of the present disclosure, with a section A of FIG. 2 enlarged, and FIG. 5 is a perspective view illustrating the rotor disk assembly DA according to an embodiment of the present disclosure.

Throughout the specification, as shown in FIG. 5, the direction along which the tie rod 1120 extends may be referred to as an axial direction X. The axial direction X may be referred to as a lateral direction. The one lateral direction/end in the axial direction X may be referred to as a first lateral direction/end, and the opposite lateral direction/end in the axial direction X may be referred to as a second lateral direction/end.

Also, as shown in FIG. 5, the direction from the center of the tie rod 1120 toward the peripheral surface of the compressor rotor disk 1110, which perpendicular to the axial direction X, may be referred to as a radial direction Y. The radially inward end/side/direction and radially outward end/side/direction in the radial direction Y may be referred to as a lower end/side/direction and an upper end/side/direction, respectively. Similarly, the radially inward end and the radially inward end surface of the compressor rotor disk 1110 that faces the circumference of the tie rod 1120 may be referred to as a bottom and a bottom surface of the compressor rotor disk 1110, respectively.

The rotor disk assembly DA performs substantially the same function as the conventional stiffener S illustrated in FIG. 3, while allowing for a simpler manufacturing process, improved assembly convenience, and reduced material costs.

Although the rotor disk assembly DA is illustrated in this description as being formed between the compressor rotor disk 1110 and the tie rod 1120, the present disclosure is not limited thereto and the rotor disk assembly DA may be formed between any rotor disk and tie rod 1120 included in a gas turbine. For example, the rotor disk assembly DA may be formed between the turbine rotor disk 1320 and the tie rod 1120. Additionally, the rotor disk assembly DA may be formed between the torque tube disk 1410 and the tie rod 1120.

Referring to FIGS. 4 and 5, the rotor disk assembly DA includes a compressor rotor disk 1110, a protrusion 1111, a tie rod 1120, and a contact 1121.

The compressor rotor disk 1110 is formed in the shape of an annular ring, and the tie rod 1120 passes through the center of the compressor rotor disk. A plurality of compressor rotor disks 1110 are provided to rotate with the rotation of the tie rod 1120 to rotate the compressor blades 1130. The plurality of compressor rotor disks 1110 are fastened so as not to be axially spaced apart from each other along the tie rod 1120. Each of the compressor rotor disks 1110 is aligned along the axial direction while the tie rod 1120 passes therethrough.

The tie rod 1120 is disposed to penetrate the centers of the plurality of compressor rotor disks 1110 and turbine rotor disks 1320. The tie rod 1120 may consist of one or a plurality of tie rods. The tie rod 1120 receives torque generated by the turbine section 1300 via the torque tube 1400 to rotate the compressor rotor disks 1110.

According to an embodiment of the present disclosure, the protrusion 1111 is formed on one side of a lower portion of the compressor rotor disk 1110. The protrusion 1111 may be formed to protrude in the first lateral direction (in the direction along the tie rod 1120) from a bottom surface of the compressor rotor disk 1110 toward an adjacent compressor rotor disk 1110. The protrusion 1111 may be formed integrally with the compressor rotor disk 1110 in the same annular ring shape as the compressor rotor disk 1110.

The protrusion 1111 may be inclined toward the radially inward direction. Thus, a first inclined surface 1111*a* of the protrusion 1111, which is a lower surface of the protrusion 1111, is also inclined toward the outer peripheral surface of the tie rod 1120 (i.e., is inclined radially inwardly) at a first predetermined angle relative to the lateral direction. Similarly, an upper incline surface 1111*b* of the protrusion 1111, which is an upper surface of the protrusion 1111, is also inclined toward the outer peripheral surface of the tie rod 1120 (i.e., is inclined radially inwardly) at a second predetermined angle relative to the lateral direction. The second predetermined angle is larger than the first predetermined angle. The upper inclined surface 1111*b* of the protrusion 1111 may be in contact with a lower end edge at the second lateral end of the adjacent compressor rotor disk 1110 when the compressor rotor disk 1110 and the adjacent compressor rotor disk 1110 and the tie rod 1120 are assembled. The lower end edge at the second lateral end of the adjacent compressor rotor disk 1110 may be rounded to prevent wear of the protrusion 1111 by contact friction with the protrusion 1111, specifically, the upper inclined surface 1111*b* of the protrusion 1111.

The contact 1121 is formed on the outer peripheral surface of the tie rod 1120. The contact 1121 may be formed at a location corresponding to the protrusion 1111. The contact 1121 may be integrally formed with the tie rod 1120 by protruding radially outward from the tie rod 1120. A top surface (i.e., an upper surface) of the contact 1121 may include a first side surface, located at its first lateral side, and a second side surface, located at its second lateral side, inclined in opposite directions relative to the lateral direction, and further include an upper tip between the first side surface and the second side surface. The first side surface may be referred to as a second inclined surface 1121*a*. The second inclined surface 1121*a* may be formed at an angle, relative to the lateral direction, corresponding to the first inclined surface 1111*a* of the protrusion 1111. By having the first inclined surface 1111*a* and the second inclined surface 1121*a* formed at a corresponding angle to each other, the rotor disk assembly DA may enable the protrusion 1111 to slide over the contact 1121 in the first lateral direction, thereby improving the convenience of assembly.

According to an embodiment, some compressor rotor disks 1110 among a plurality of compressor rotor disks have a protrusion 1111 while some other compressor rotor disks 1110 among the plurality of compressor rotor disks do not have a protrusion 1111.

Figure 6:
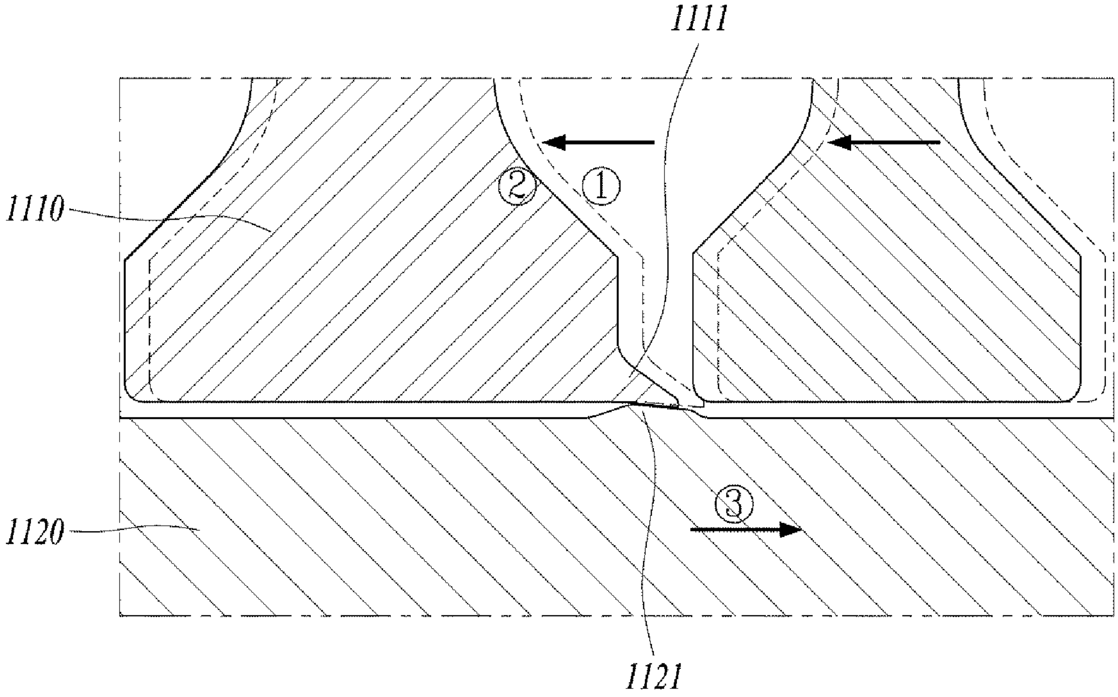
FIGS. 6 and 7 are views illustrating a procedure of installing the rotor disk by using the rotor disk assembly according to an embodiment of the present disclosure.
Figure 7:
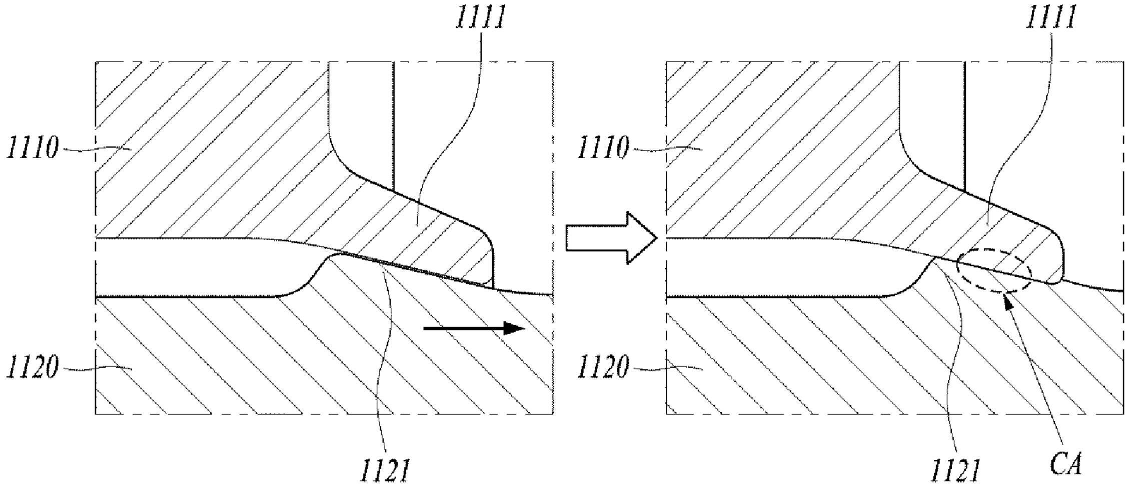

FIGS. 6 and 7 are views illustrating a procedure of installing the rotor disk by using the rotor disk assembly according to an embodiment of the present disclosure.

First, a rotor disk 1110 having a protrusion 1111 formed as illustrated in sections ① and ② of FIG. 6 and a conventional rotor disk 1110 are sequentially stacked in a stacking direction. The stacking direction is the second lateral direction, the opposite direction to the first lateral direction in which the protrusion 1111 protrudes. At this time, as in left side of FIG. 7, the protrusion 1111 is slidably disposed on the contact 1121 formed on the outer peripheral surface of the tie rod 1120.

Next, the tie rod 1120 is tensioned in the first lateral direction, the direction opposite to the stacking direction of the rotor disks 1110, as in section ③ of FIG. 6. As a result of tensioning the tie rod 1120, the protrusion 1111 and the contact 1121 are in close contact with each other in a contact area CA, as in right side of FIG. 7, and perform substantially the same function as a prior art stiffener S.

According to the rotor disk assembly DA according to one embodiment of the present disclosure described above, a manufacturing process can be made simpler, assembly convenience can be improved, and material costs can be reduced while performing substantially the same functions as the conventional stiffener S. That is, the conventional process, which involves fitting the annular ring-shaped stiffener S into the outer peripheral surface of the tie rod 1120 and inserting its end into the compressor rotor disk 1110's tie rod 1120 side end, and then assembling the annular ring-shaped stiffener S to the compressor rotor disk 1110 and the tie rod 1120 using a hot-sealing method, can be eliminated. This streamlining of the manufacturing process enhance assembly ease and efficiency.

While the embodiments of the present disclosure have been described, it will be apparent to those skilled in the art that various modifications and variations can be made in the present disclosure through addition, change, omission, or substitution of components without departing from the spirit of the disclosure as set forth in the appended claims, and such modifications and changes may also be included within the scope of the present disclosure. Also, it is noted that any one feature of an embodiment of the present disclosure described in the specification may be applied to another embodiment of the present disclosure. Similarly, the present invention encompasses any embodiment that combines features of one embodiment and features of another embodiment.

The invention claimed is:

1. A rotor disk assembly comprising:
- a rotor disk;
- a protrusion formed on one side of a lower portion of the rotor disk; and
- a contact protruding from an outer peripheral surface of a tie rod to contact the protrusion to prevent sagging of the tie rod and control vibration,
- wherein the protrusion is formed to protrude laterally from a rotor disk bottom surface of a radially inner end of the rotor disk,
- wherein a protrusion bottom surface of the protrusion is inclined relative to an elongated direction of the tie rod at a first angle.

2. The rotor disk assembly of claim 1, wherein the protrusion is integrally formed with the rotor disk.

3. The rotor disk assembly of claim 1, wherein the contact is integrally formed with the tie rod.

4. The rotor disk assembly of claim 3, wherein the contact is formed in a position corresponding to the protrusion.

5. The rotor disk assembly of claim 3, wherein the contact is provided on an upper surface thereof with a first inclined surface inclined relative to the elongated direction of the tie rod at the same first angle corresponding to the protrusion bottom surface of the protrusion, such that the protrusion bottom surface of the protrusion and the first inclined surface of the contact correspond to and meet each other while forming the same first angle relative to the elongated direction of the tie rod.

6. The rotor disk assembly of claim 5, wherein the contact is provided on the upper surface thereof with a second inclined surface inclined relative to the elongated direction of the tie rod at a second angle, different from the first angle.

7. The rotor disk assembly of claim 1, wherein the rotor disk is a compressor rotor disk.

8. The rotor disk assembly of claim 1, wherein the rotor disk is a turbine rotor disk.

9. The rotor disk assembly of claim 1, wherein the rotor disk is a torque tube disk.

10. A gas turbine comprising:

a compressor configured to compress air;

a combustor configured to mix the compressed air from the compressor with fuel and combust a compressed air-fuel mixture;

a turbine section rotated by combustion gases from the combustor to generate power; and a rotor disk assembly comprising:

a rotor disk;

a protrusion formed on one side of a lower portion of the rotor disk; and a contact protruding from an outer peripheral surface of a tie rod installed through the rotor disk to contact the protrusion to prevent sagging of the tie rod and control vibration, wherein the protrusion is formed to protrude laterally from a rotor disk bottom surface of a radially inner end of the rotor disk, wherein a protrusion bottom surface of the protrusion is inclined relative to an elongated direction of the tie rod at a first angle.

11. The gas turbine of claim 10, wherein the protrusion is integrally formed with the rotor disk.

12. The gas turbine of claim 10, wherein the contact is integrally formed with the tie rod.

13. The gas turbine of claim 12, wherein the contact is formed in a position corresponding to the protrusion.

14. The gas turbine of claim 12, wherein the contact is provided on an upper surface thereof with a first inclined surface inclined relative to the elongated direction of the tie rod at the same first angle corresponding to the protrusion bottom surface of the protrusion, such that the protrusion bottom surface of the protrusion and the first inclined surface of the contact correspond to and meet each other while forming the same first angle relative to the elongated direction of the tie rod.

15. The gas turbine of claim 10, wherein the rotor disk is a compressor rotor disk.

16. The gas turbine of claim 10, wherein the rotor disk is a turbine rotor disk.

17. The gas turbine of claim 10, wherein the rotor disk is a torque tube disk.

* * * * *